(12) United States Patent
Meazell

(10) Patent No.: US 9,912,016 B2
(45) Date of Patent: Mar. 6, 2018

(54) LINK FOR BATTERY POWER TRANSFER BETWEEN PORTABLE ELECTRONIC DEVICES

(71) Applicant: Ford Meazell, Austin, TX (US)

(72) Inventor: Ford Meazell, Austin, TX (US)

(*) Notice: Subject to any disclaimer, the term of this patent is extended or adjusted under 35 U.S.C. 154(b) by 164 days.

(21) Appl. No.: 13/858,936

(22) Filed: Apr. 8, 2013

(65) Prior Publication Data

US 2014/0299372 A1  Oct. 9, 2014

(51) Int. Cl.

| | |
|---|---|
| *H01M 10/44* | (2006.01) |
| *H01M 2/20* | (2006.01) |
| *G06F 1/26* | (2006.01) |
| *H01R 31/00* | (2006.01) |
| *H01M 10/42* | (2006.01) |

(52) U.S. Cl.
CPC .......... *H01M 10/441* (2013.01); *G06F 1/263* (2013.01); *G06F 1/266* (2013.01); *H01M 2/204* (2013.01); *H01R 31/005* (2013.01); *H01M 2010/4278* (2013.01)

(58) Field of Classification Search
USPC .......................................... 439/502; 320/107
See application file for complete search history.

(56) References Cited

U.S. PATENT DOCUMENTS

| | | | | |
|---|---|---|---|---|
| 6,928,310 | B2 * | 8/2005 | Lee | 455/572 |
| 7,540,788 | B2 * | 6/2009 | Murphy et al. | 439/676 |
| 7,918,689 | B2 * | 4/2011 | Sloey et al. | 439/607.01 |
| 2005/0070153 | A1 * | 3/2005 | Tang | 439/502 |
| 2008/0104301 | A1 * | 5/2008 | Assouad | G06F 1/1632 |
| | | | | 710/303 |
| 2009/0251008 | A1 * | 10/2009 | Sugaya | G06F 1/263 |
| | | | | 307/104 |
| 2011/0068736 | A1 * | 3/2011 | Chartier et al. | 320/107 |
| 2011/0151724 | A1 * | 6/2011 | Fadell et al. | 439/660 |
| 2011/0188677 | A1 * | 8/2011 | Rothkopf et al. | 381/150 |

(Continued)

FOREIGN PATENT DOCUMENTS

| | | | | |
|---|---|---|---|---|
| KR | 2020070798 | * | 7/2012 | H02J 7/34 |
| KR | 20120070798 | * | 7/2012 | H02J 7/34 |

OTHER PUBLICATIONS http:// web.archive.org/web/20080109045826/http://www.hdmi.org/installers/insidehdmicable.aspx Founders: Hitachi, Panasonic, Philips, Silicon Image, Sony, Thomson, Toshiba Title: Inside an HDMI cable Date: Jan. 9, 2008 (C) 2003-2008 HDMI Licensing, LLC. All rights reserved.*

(Continued)

*Primary Examiner* — Jeremy C Norris
*Assistant Examiner* — Muhammed Azam
(74) *Attorney, Agent, or Firm* — Spradley PLLC; Michael Spradley

(57) ABSTRACT

A system and method for transferring battery power transfer between portable electronic devices is disclosed. Specifically, a battery to battery transfer system and method is disclosed, in which a first portable electronic device comprising a first battery and a second portable electronic device and a second portable electronic device comprising a second battery are connected by a connecting device capable of attaching both portable electronic devices and transferring power from the first battery to the second battery. Furthermore, first electronic device is capable of outputting power from the first battery.

13 Claims, 5 Drawing Sheets

(56) References Cited

U.S. PATENT DOCUMENTS

| | | | |
|---|---|---|---|
| 2011/0244716 A1* | 10/2011 | Kruckenberg | 439/502 |
| 2012/0077384 A1* | 3/2012 | Bar-Niv et al. | 439/625 |
| 2012/0081067 A1* | 4/2012 | Burrell, IV | 320/107 |
| 2012/0122348 A1* | 5/2012 | Cho et al. | 439/660 |
| 2013/0049675 A1* | 2/2013 | Minami | H02J 7/0054 320/103 |
| 2013/0065444 A1* | 3/2013 | Bushnell et al. | 439/620.22 |
| 2013/0130743 A1* | 5/2013 | Lin | 455/557 |
| 2013/0320913 A1* | 12/2013 | Chen | H02J 7/0042 320/103 |
| 2013/0334883 A1* | 12/2013 | Kim | H02J 7/34 307/29 |
| 2014/0132216 A1* | 5/2014 | Tan | G06F 1/263 320/114 |
| 2014/0152235 A1* | 6/2014 | Huang | G06F 1/1632 320/107 |
| 2015/0244185 A1* | 8/2015 | Won | G06F 1/266 320/103 |
| 2016/0041932 A1* | 2/2016 | Hokari | G06F 13/28 710/308 |
| 2016/0064959 A1* | 3/2016 | Jung | G06F 1/266 320/162 |

OTHER PUBLICATIONS http:// web.archive.org/web/20080109045826/http://www.hdmi.org/installers/insidehdmicable.aspx Founders: Hitachi, Panasonic, Phillips, Silicon Image, Sony, Thomson, Toshiba Title: Inside an HDMI cable Date: Jan. 9, 2008 (c) 2003-2008 HDMI Licensing, LLC. All rights reserved.*

* cited by examiner

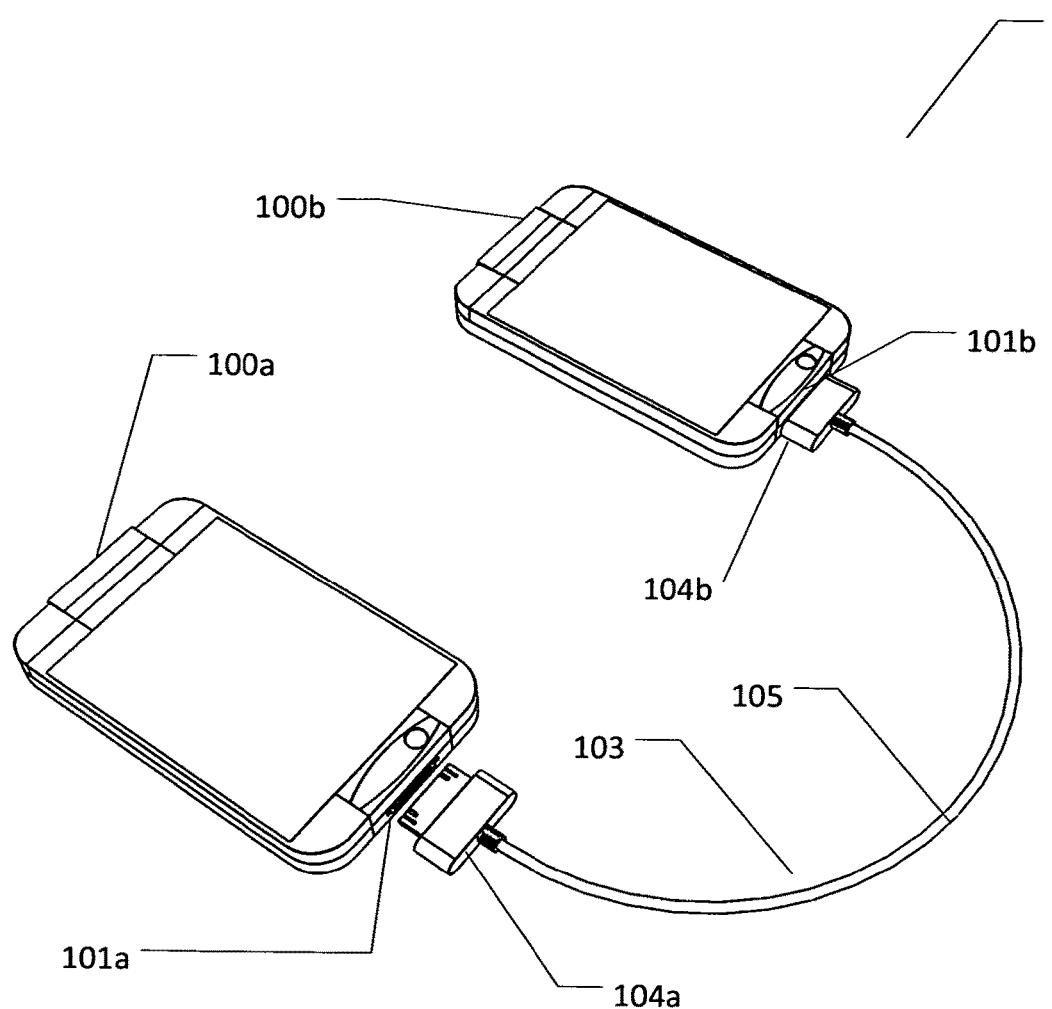
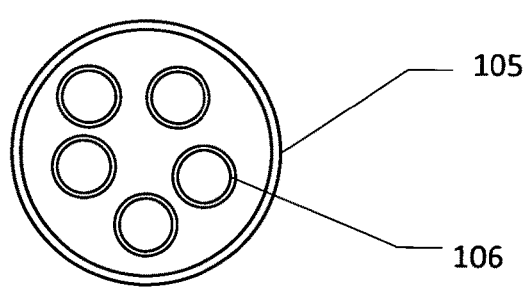
Fig. 1A
Fig. 1B

LINK FOR BATTERY POWER TRANSFER BETWEEN PORTABLE ELECTRONIC DEVICES

BACKGROUND

This disclosure relates to a system and method for battery power transfer between mobile devices. For purposes of this disclosure, a system and method for battery power transfer from one mobile device to another are discussed, and are an example of a system of method for transferring battery power from the battery source of one portable electronic device to another. However, such discussion of a system and method for battery power transfer between mobile devices is solely exemplary, and not limiting.

Methods for transferring battery power have evolved over the years. As battery technology evolved to create more powerful and compact batteries, portable devices proliferated. However, today's mobile devices are unable to transfer stored battery power for storage into another portable electronic device. Instead, portable electronic devices require charging a direct connection from a charger plugged into an electrical source. Such methods are inconvenient, as users can frequently find themselves away from an electrical outlet or other electrical source.

As such it would be useful to have an improved system and method for a link for battery power transfer between mobile devices.

SUMMARY

This disclosure describes a link for battery transfer between mobile devices. The link can comprise a plurality of wires each having a first end and a second end. The link can also comprise a first connector and second connector. The first connector can connect to the first ends of the wires, and can be connectable to a first mobile device port. The second connector can be connected to the second ends of the wires, and can be connectable to a second mobile device charging port.

BRIEF DESCRIPTION OF THE DRAWINGS

FIG. 1A illustrates two mobile devices connected by a link for battery power transfer.
FIG. 1B illustrates wires within a cord.

DETAILED DESCRIPTION

Figure 2:
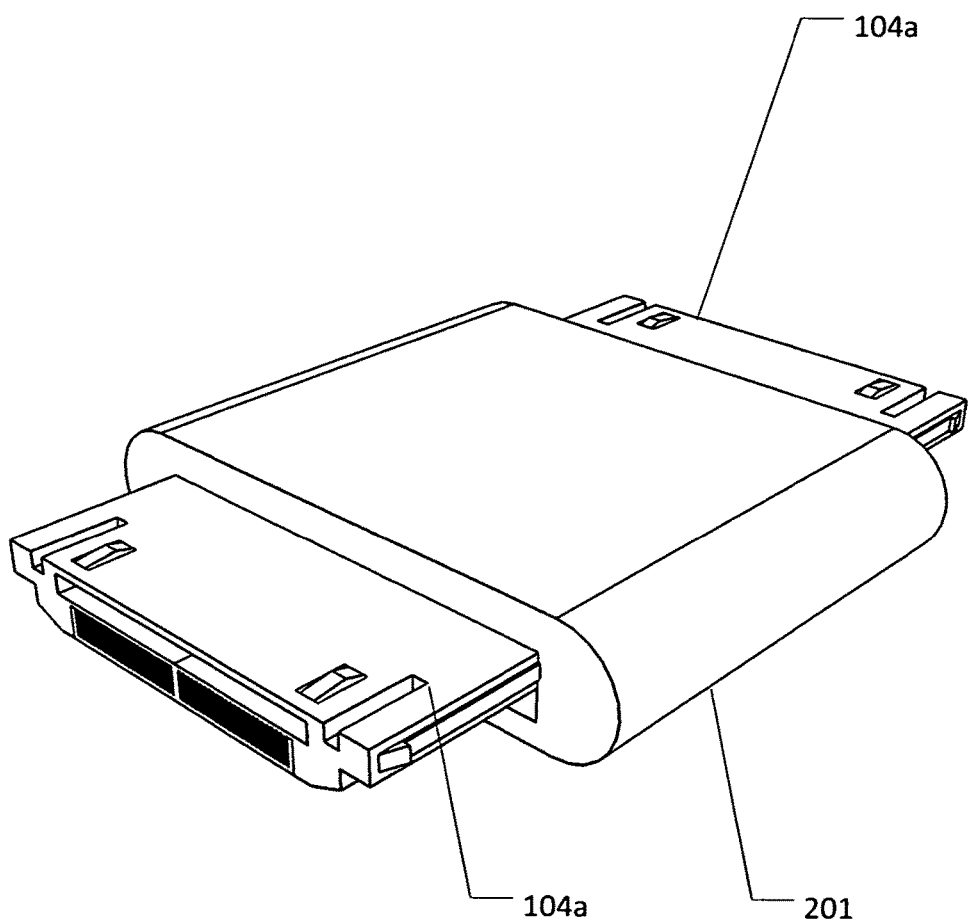
FIG. 2 illustrates a compact link.

Described herein is a system and method for battery power transfer between mobile devices. The following description is presented to enable any person skilled in the art to make and use the invention as claimed and is provided in the context of the particular examples discussed below, variations of which will be readily apparent to those skilled in the art. In the interest of clarity, not all features of an actual implementation are described in this specification. It will be appreciated that in the development of any such actual implementation (as in any development project), design decisions must be made to achieve the designers' specific goals (e.g., compliance with system- and business-related constraints), and that these goals will vary from one implementation to another. It will also be appreciated that such development effort might be complex and time-consuming, but would nevertheless be a routine undertaking for those of ordinary skill in the field of the appropriate art having the benefit of this disclosure. Accordingly, the claims appended hereto are not intended to be limited by the disclosed embodiments, but are to be accorded their widest scope consistent with the principles and features disclosed herein.

FIG. 1A illustrates two mobile devices 100 attached by connection/link for battery power transfer. Mobile devices 100 can include any communication or entertainment handheld device with the capability of operating independently of a direct plug-in to an electrical outlet. Specifically, mobile devices 100 can be portable and comprise a battery source internally that allows mobile device to receive power from external electrical sources. Mobile devices 100 can comprise, but are not limited to, cellular phones, MP3 players, CD players, or electronic tablets.

For access to battery power, mobile device 100 can have a port 101. In one embodiment port 101 can receive power and charge battery of mobile devices 100. In one embodiment, port 101 can transfer power out of mobile devices 100. In another embodiment, port 101 can both transmit and receive power. Whether used for input or output, port 101 can comprise any number or arrangement of connector pins, for example, and/or other electronic socket arrangements, which can be plugged into. For purposes of this disclosure, port 101 can be male or female.

In one embodiment, mobile devices 100 can each also have two separate ports 101, in which the first port 101 can receive input battery power, while the second port 101 can transmit output transfer power to another battery-operated device. In one embodiment, either first port 101 or second port 101 can have dual input-output transfer capabilities.

For the purposes of this disclosure, when one of mobile devices 100 transfers battery power to another battery, it can be referred to as a transferring mobile device 100a. Additionally, when mobile device 100 receives battery power from another device, it can be referred to as a receiving mobile device 100b. Transferring mobile device 100a can have a transferring port 101a. Transferring port 101a can be located on any surface of transferring mobile device 100a. Transferring port 101a can be accessible to link 103 for transfer of battery power. Receiving mobile device 100b can have a receiving port 101b. Receiving port 101b can be located on any surface of receiving mobile device 100b. Receiving port 101b can be accessible to link 103 for receiving battery power.

To facilitate transfer of power, mobile devices 100 can connect to link 103, which can connect mobile devices 100 together. In one embodiment, link 103 can comprise a cord with connectors 104 on each end capable of plugging into a port 101 on a surface of mobile devices 100. Link 103 can comprise a receiving connector 104a on one end, and a transferring connector 104b. Each connector 104, in one embodiment, can comprise one or more pins. Connector 104 is connectable to port 101, and can be female or male. Transferring port 101a can connect to receiving connector 104a, and transferring connector 104b can connect with receiving port 101b, in one embodiment by a cord. Connector 104 can include, but is not limited to, DC connectors, coaxial power connectors, mini USB connectors, micro USB connectors, or any iPhone connectors such as a 19 pin or 30-pin connector.

In one embodiment, link 103 can comprise a diode or other hardware which only allows for power to pass one direction between mobile devices 100 (unidirectional). In such embodiment, power transfer can occur from a transferring mobile device 100*a* to a receiving mobile device 100*b*. In another embodiment, link 103 can have two-way transfer abilities between mobile devices 100 (bidirectional). In such embodiment, mobile devices 100*a* and 100*b* can transfer power in either direction.

Transferring port 101*a* can have the same reciprocal structures of connectors found in, but not limited to, AC adapter, DC connectors, coaxial power connectors, DC/DC convertors or even mini or micro Universal Serial Bus (USB) connectors. For example, link 103 can comprise power connectors, which can include a safety ground connection and the power conductors, as well as other features to prevent fault currents. For purposes of this disclosure, connectors specifically excludes USB connectors, except mini and micro USB connectors used in small handheld devices, and ports specifically excludes USB ports, except mini and micro USB ports found in small handheld devices.

Link 103 can be established once transferring connector 104*a* inserts into transferring port 101*a*. Once linked, transferring mobile device 100*a* can produce transferable power from battery across link 103. In one embodiment, insertion of transferring connector 301 into transferring port 101*a* can immediately trigger the flow of power from transferring mobile device 100*a*. In another embodiment, the transfer of energy can be regulated and controlled by other means, as discussed below.

FIG. 1B illustrates wires 106 within cord 105. Wires can connect pins of transferring connector 104*b* to pins of receiving connector 104*a*.

FIG. 2 illustrates a compact link 103. In one embodiment, link 103 can comprise a solid casing 201 surrounding wire which can complete circuit between mobile devices 100. Solid casing 201 can be any variety of shapes necessary to accommodate the plugging in of mobile devices 100. Solid casing 201 can be compatible with adapters capable of fitting into a variety of ports 101 and/or connectors 104, brands and types of mobile devices 100.

Figure 3:
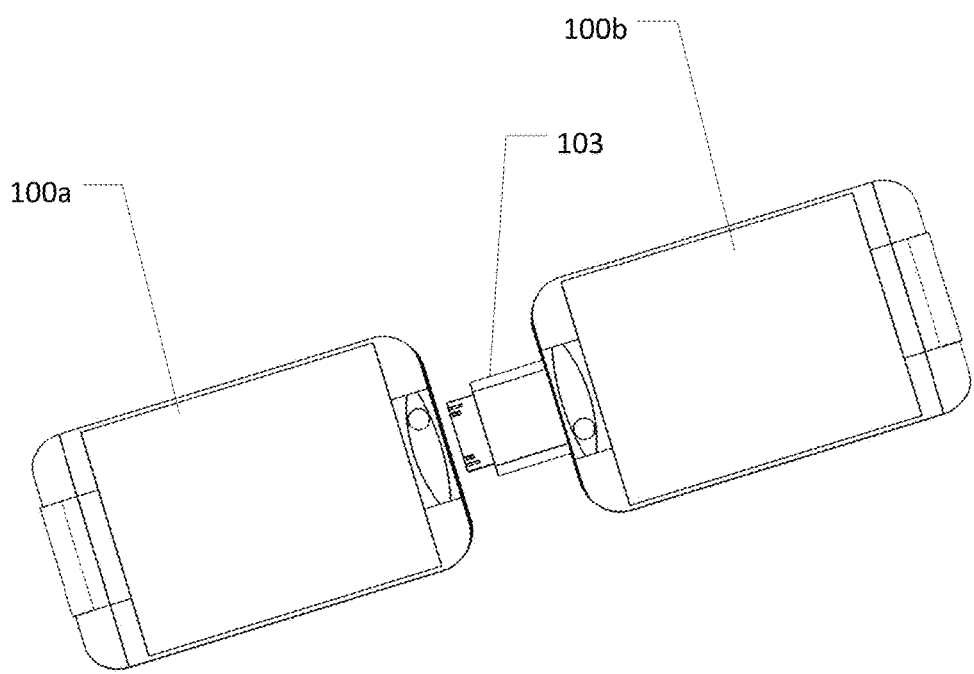
FIG. 3 illustrates a transferring mobile device and a receiving mobile device connected by a compact link.

FIG. 3 illustrates transferring mobile device 100*a* and receiving mobile device 100*b* connected by compact link 103.

Figures 4, 5:
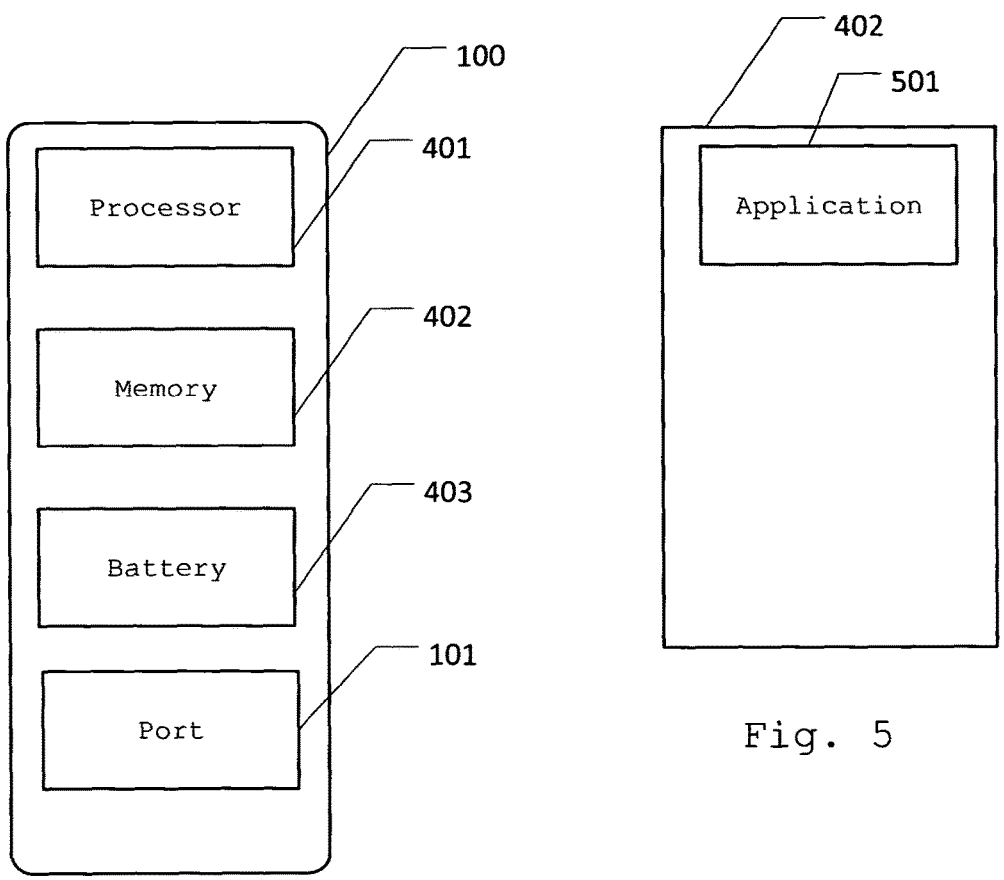
FIG. 4 illustrates hardware within a mobile device.
FIG. 5 illustrates memory within a mobile device.

FIG. 4 illustrates internal hardware of mobile device 100 comprising a processor 401, a memory 402, and a battery 403. Processor 401 can be a device that executes computer-readable program code stored in memory 402. Memory 402 can be any computer readable storage medium. For purpose of this application computer-readable storage medium includes only non-transitory mediums. Battery 403 can include one or more batteries, which can be rechargeable. Battery 403 can comprise, but is not limited to, lithium-ion, zinc-carbon, or alkaline battery.

Battery 403 can also be organized in various arrangements, which can include, but is not limited to, a parallel arrangement or a serial arrangement. Within structure of mobile devices 100, battery 403 can be connected, by wiring and switches controllable by mobile device 100 for example, and/or an internal circuit arrangement, to port 101. In one embodiment, such wiring and/or internal circuit arrangements can attach battery 403 to multiple ports 101. Once link 103 connects transferring mobile device 100*a* to receiving mobile device 100*b*, battery 403 can transfer power through link 103.

FIG. 5 illustrates memory 402 comprising a mobile application 208. Mobile application 501 can reside and perform logical functions within memory 402. Mobile application 501 can receive instructions from a user and be used to set mobile device 100 into either receive mode or transfer mode.

Figure 6:
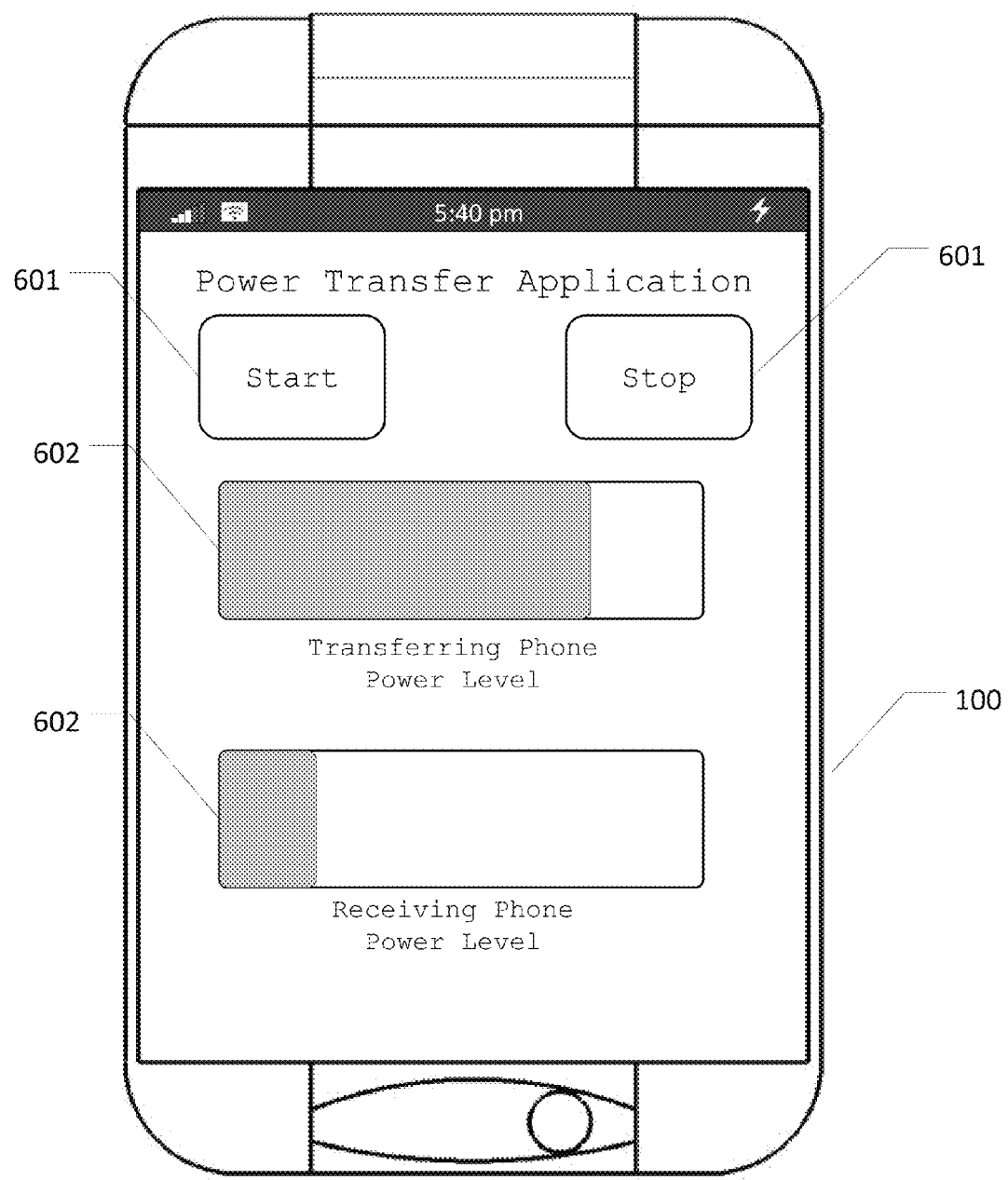
FIG. 6 illustrates a mobile application running on a transferring mobile device.

FIG. 6 illustrates application 501. In one embodiment, transferring mobile device 100*a* can transfer power to receiving mobile device 100*b* once link 103 is plugged into both ports, and can transfer power until link 103 is unplugged, until battery 403 in transferring mobile device 100*a* has transferred all power, and/or until battery 403 in receiving mobile device 100*b* has reached capacity. As a result, the user can simply control the amount of energy transferred by timing how long link 103 is connected to both electronic devices. After desired amount of power transfer is reached, user can unplug link 103 from a mobile device 100. Such embodiment can be achieved using a unidirectional link. Application 501 can be programmed to determine the presence and direction of the link to determine if mobile device 100 is transferring mobile device 100*a*. If so, application 501 can put transferring mobile device in transfer mode. Transferring mobile device 100*a* can use application 501 to trigger, control and halt power transfer between mobile devices 100.

In another embodiment, application 501 can comprise a graphical user interface with one or more buttons 601 that start and/or stop power transfer between transferring mobile device 100*a* and receiving mobile device 100*b*.

In another embodiment, application 501 can comprise a graphical user interface with one or more buttons 601 that start and/or stop power transfer between transferring mobile device 100*a* and receiving mobile device 100*b*.

In one embodiment, application 501 can display battery levels 602 and/or amount transferred for one or both devices. On screen displays can display battery levels 602 as a percentage, for example. In another embodiment, light signals on mobile devices 100 can be used as indicators or insertion, power transfer activation, and/or power transfer completion. To display battery level 602 of receiving phone, application can estimate it by the amount of power transferred, or if receiving mobile device 100*b* also has application 501 running, receiving can, in one embodiment establish a communication link with transferring mobile device 100*a*, and send a precise battery level back to transferring mobile application 100*a* for display using application 501.

Furthermore, mobile devices 100 can comprise different types of cellular phones as transferring mobile device 100*a* and the receiving mobile device 100*b*. In another embodiment, mobile devices 100 can comprise a phone connected with another type of device, such as an electronic tablet for example. Differing devices can be of the same brand or different brands.

Various changes in the details of the illustrated operational methods are possible without departing from the scope of the following claims. Some embodiments may combine the activities described herein as being separate steps. Similarly, one or more of the described steps may be omitted, depending upon the specific operational environment the method is being implemented in. It is to be understood that the above description is intended to be illustrative, and not restrictive. For example, the above-described embodiments may be used in combination with each other. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A link comprising
a plurality of wires each having a first end and a second end;
a transferring connector having a first male end connected to the first ends of said wires, said transferring connector connectable to a first mobile device port, said first mobile device port an audio port, wherein said transferring connector is a 30-pin connector; and
a receiving connector having a second male end connected to the second ends of said wires, said receiving connector connectable to a second mobile device charging port, wherein said receiving connector is one of a second 30-pin connector or a 19-pin connector,
said wires, said transferring connector, and said receiving connector configured to transfer power from said first mobile device port to said second mobile device charging port.

2. The link of claim 1 wherein said receiving connector is said 19-pin connector.

3. The link of claim 1 wherein said receiving connector is said second 30-pin connector.

4. A link comprising
a plurality of wires each having a first end and a second end;
a transferring connector having a first male end connected to the first ends of said wires, said transferring connector connectable to a first mobile device port, said first mobile device port an audio port, wherein said transferring connector is an audio jack; and
a receiving connector having a second male end connected to the second ends of said wires, said receiving connector connectable to a second mobile device charging port, wherein said receiving connector is one of a 30-pin connector or 19-pin connector,
said wires, said transferring connector, and said receiving connector configured to transfer power from said first mobile device port to said second mobile device charging port.

5. The link of claim 4 wherein said receiving connector is said 19-pin connector.

6. The link of claim 4 wherein said receiving connector is said 30-pin connector.

7. The link of claim 4, wherein said wires are predominately encased in a cord.

8. The link of claim 4 wherein said wires are predominantly encased within a compact solid casing.

9. A link comprising
a plurality of wires each having a first end and a second end;
a transferring connector having a first male end connected to the first ends of said wires, said transferring connector connectable to a first mobile device port, said first mobile device port an audio port, wherein said transferring connector is a 19-pin connector; and
a receiving connector having a second male end connected to the second ends of said wires, said receiving connector connectable to a second mobile device charging port, wherein said receiving connector is a 30-pin connector,
said wires, said transferring connector, and said receiving connector configured to transfer power from said first mobile device port to said second mobile device charging port.

10. The link of claim 9, wherein said wires are predominately encased in a cord.

11. The link of claim 9 wherein said wires are predominantly encased within a compact solid casing.

12. The link of claim 1, wherein said wires are predominately encased in a cord.

13. The link of claim 1 wherein said wires are predominantly encased within a compact solid casing.

* * * * *